United States Patent

[15] 3,643,223
[45] Feb. 15, 1972

Ruth et al.

[54] BIDIRECTIONAL TRANSMISSION DATA LINE CONNECTING INFORMATION PROCESSING EQUIPMENT

[72] Inventors: Richard L. Ruth, Paradise Valley; William A. Shelly, Phoenix, both of Ariz.

[73] Assignee: Honeywell Information Systems Inc.

[22] Filed: Apr. 30, 1970

[21] Appl. No.: 33,436

[52] U.S. Cl. ....................340/172.5
[51] Int. Cl. ....................G06f 13/00
[58] Field of Search ....................340/172.5; 235/157

[56] References Cited

UNITED STATES PATENTS

| | | | |
|---|---|---|---|
| 3,473,160 | 10/1969 | Wahlstrom | 340/172.5 |
| 3,226,687 | 12/1965 | Amdahl et al. | 340/172.5 |
| 3,226,689 | 12/1965 | Amdahl et al. | 340/172.5 |
| 3,226,688 | 12/1965 | Amdahl et al. | 340/172.5 |
| 3,106,698 | 10/1963 | Unger | 340/172.5 |
| 3,331,055 | 7/1967 | Betz et al. | 340/172.5 |
| 3,366,931 | 1/1968 | Githens | 340/172.5 |
| 3,495,217 | 2/1970 | Brooks | 340/147 |
| 3,413,613 | 11/1968 | Bahrs et al. | 340/172.5 |

*Primary Examiner*—Paul J. Henon
*Assistant Examiner*—Mark Edward Nusbaum
*Attorney*—Edward W. Hughes and Fred Jacob

[57] ABSTRACT

A communicating port in an information processing device is equipped with an interconnected logic gating wherein the bidirectional transmission line is connected to an output of one logic gate and to an input of another logic gate. Series and parallel interconnections permit one bidirectional transmission line for each bit of information per device and per port of each device, respectively. A transmitter-receiver circuit pair is disclosed for the logic gating using current mode logic driving a grounded base amplifier.

15 Claims, 5 Drawing Figures

INVENTORS.
RICHARD L. RUTH
WILLIAM A. SHELLY
BY
James A. Pershon
ATTORNEY

BIDIRECTIONAL TRANSMISSION DATA LINE CONNECTING INFORMATION PROCESSING EQUIPMENT

BACKGROUND OF THE INVENTION

This invention relates generally to an information processing system and more particularly to bidirectional transmission apparatus in a data processing system and a solid state logic circuit for use with the transmission line apparatus.

Digital computing systems for large scale applications require a modular yet fully integrated system. Modularity provides full configuration flexibility. Basic equipment modules permit establishing a configuration for current needs that can be expanded to other configurations to meet growing needs. Thus the basic modules, the memory modules, the processor modules, and the input/output controller modules, each occupy a separate cabinet and require a large number of signal transmission paths to interconnect the cabinets.

An example of such a system is a time-sharing computer having multiple processors and multiple phased memories. Each processor occupies a separate cabinet and is required to both transmit and receive data from each memory occupying a separate cabinet. Each input and output signal from the module generally comprises a number of parallel bits of information. If the conventional approach to interconnecting the cabinets is used, the number of transmission cables, connectors, and circuitry will be very large. The large number of cables and associated connectors and circuitry contributes a significant money cost to the system as well as mechanical and electrical design problems. The large physical volume occupied by the cables and the large panel area required for the connectors contribute to the difficulty of installing the system and contribute in a large part to subsequent failures in the system.

In the conventional interconnection of a modular data processing system, each information bit in each memory port is connected to the corresponding information bit in each processor port by both a transmit transmission line and a receive transmission line. The transmission lines are not time-shared and are unidirectional. One end of the transmission line is connected to a transmitter circuit and the other end is connected to a receiver circuit. Therefore, the number of transmission lines connected to each memory port is twice the number of information bits times the number of processor ports. The number of transmission lines connected to each processor port is twice the number of information bits times the number of memory ports. Thus what is needed is an improved method of interconnecting cabinets in a data processing system to reduce the number of transmission lines needed to interconnect the modules.

SUMMARY OF THE INVENTION

The present invention alleviates the problem of interconnecting modules of a data processing system in one embodiment by using interconnected logic gates connecting each port in the processor in parallel to a common data bus using one transmission line per information bit. The transmission line is terminated with a transmitter-receiver pair logic circuit at each end. The bidirectional transmission is determined by the transmit and receive control inputs which are associated with the logic circuitry of each transmitter-receiver circuit.

In the second embodiment each port in the system is connected in series to a common data bus by logic gates. Data information is placed on and taken off the bus by a transmitter-receiver pair logic circuit. The data bus is connected to a long transmission line terminated at each end. The transmitting and receiving ports are determined by control signals associated with each transmitter-receiver pair circuit.

The transmitter-receiver pair circuit comprises a transmit circuit including a current mode logic transmit gate controlling a grounded base amplifier driving a transmission line. The transmission line is also directed to an input of a controlled receive logic gate comprising a similar circuit in the transmitter-receiver pair. The receive circuit is a reverse of the transmit circuit and the grounded base amplifier output is directed to the data processing module internal circuitry for processing.

It is, therefore, a primary object of the invention to furnish apparatus to permit the bidirectional transmission of information on a single transmission line interconnecting modules in a data processing system.

Another object of the invention is to provide improved circuitry for connection to a single transmission line to both transmit and receive signals from the single transmission line.

Yet another object is to provide apparatus for serially interconnecting ports relating to one bit of information within a particular module to provide bidirectional transmission of signals on a single transmission line for each bit of information.

Still another object is to provide a parallel-connected logic apparatus for the bidirectional transmission of data on a single transmission line for each bit of information from each port for connection to a common data bus for communication between the various ports of the data processing system.

A further object is to provide a parallel-connected logic apparatus using a bidirectional data bus to allow the bidirectional transmission of signals between any two ports in the data processing system.

BRIEF DESCRIPTION OF THE DRAWING

Further features and a more specific description of illustrated embodiments of the invention are presented hereinafter with reference to the accompanying drawing, wherein.

DESCRIPTION OF THE PREFERRED EMBODIMENT

Figure 1:
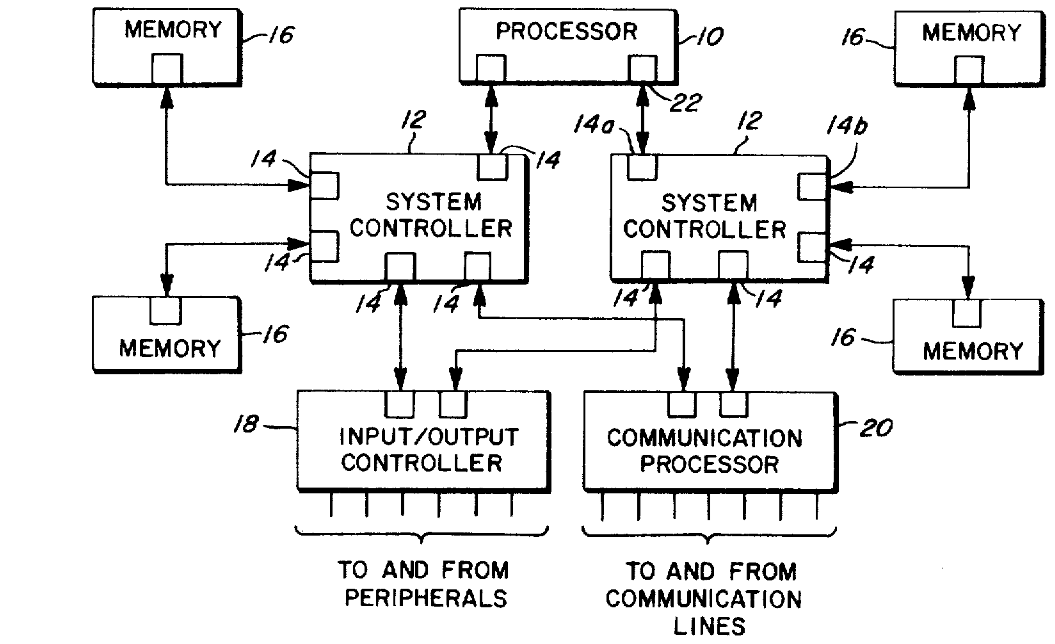
FIG. 1 is a block diagram of a data processing system for use with the embodiments described herein.

In FIG. 1 is shown a data processing system comprising several data processing modules for use with the present invention. A processor 10 in the data processing system is connected to a group of system controllers 12, two of which are shown. The system controllers 12, through channels or communicating ports 14, control the communication of the data processing system among the processor 10, a group of memory banks 16, an input/output controller 18, and a communications processor 20. The input/output controller 18 is a coordinator of all input/output operations between the complement of peripheral subsystems such as magnetic drum storage units, disc storage units, and magnetic tape storage units, and each of the plurality of system controllers 12. The communications processor 20 can be a data communication processor that automatically receives and processes information from remote terminals for direct input into the system via the system controllers, and transmits information to these terminals over common-carrier facilities.

Data information transfer into and out of the system controllers 12 and the remaining modules of the data processing system is accomplished via separate ports 14. These ports are under the control of a port select signal which selects and activates a particular port in the system to receive or transmit data information. For instance, if the processor 10 desires communication with the memory 16, a port 22 in the processor would be activated to a transmit condition and a port 14*a* in the system controller 12 would be enabled to receive the request. The system controller 12 in turn would activate a port 14*b* to communicate with the memory 16 and, via the port 14*b* and 14*a*, relay the information to the port 22 in the processor 10. Thus the ports in each of the data processing modules in the system control the communications between the modules. A further explanation of a modular data processing system can be obtained by referring to U.S. Pat. No. 3,413,613 issued to Bahrs et al., on Nov. 26, 1968, and assigned to the same assignee as the present invention.

In the description of the embodiments of the present invention, a system controller is shown controlling the communication between each module or device in the data processing system. The use of the system controller to control the communication should not be taken to limit this invention. It can readily be seen that the present invention can be used to permit bidirectional transmission to data between any particular module in the data processing system. Also the Figures show the transmission lines transmitting data information signals. With but a small change such as delays to accept only a particular length of signal, a similar circuit could be used to transmit the control signals that control the receiving and the sending ports. For instance, a transmission line could be connected among all of the devices of a data processing system as shown in FIG. 1 with a particular coded control signal being sent out by one device in order to activate a port in any other device either to transmit or to receive the data information. Thus, bidirectional control signals could be transmitted among each port in all the devices of the system using similar apparatus as described in the embodiments of this invention.

Figure 2:
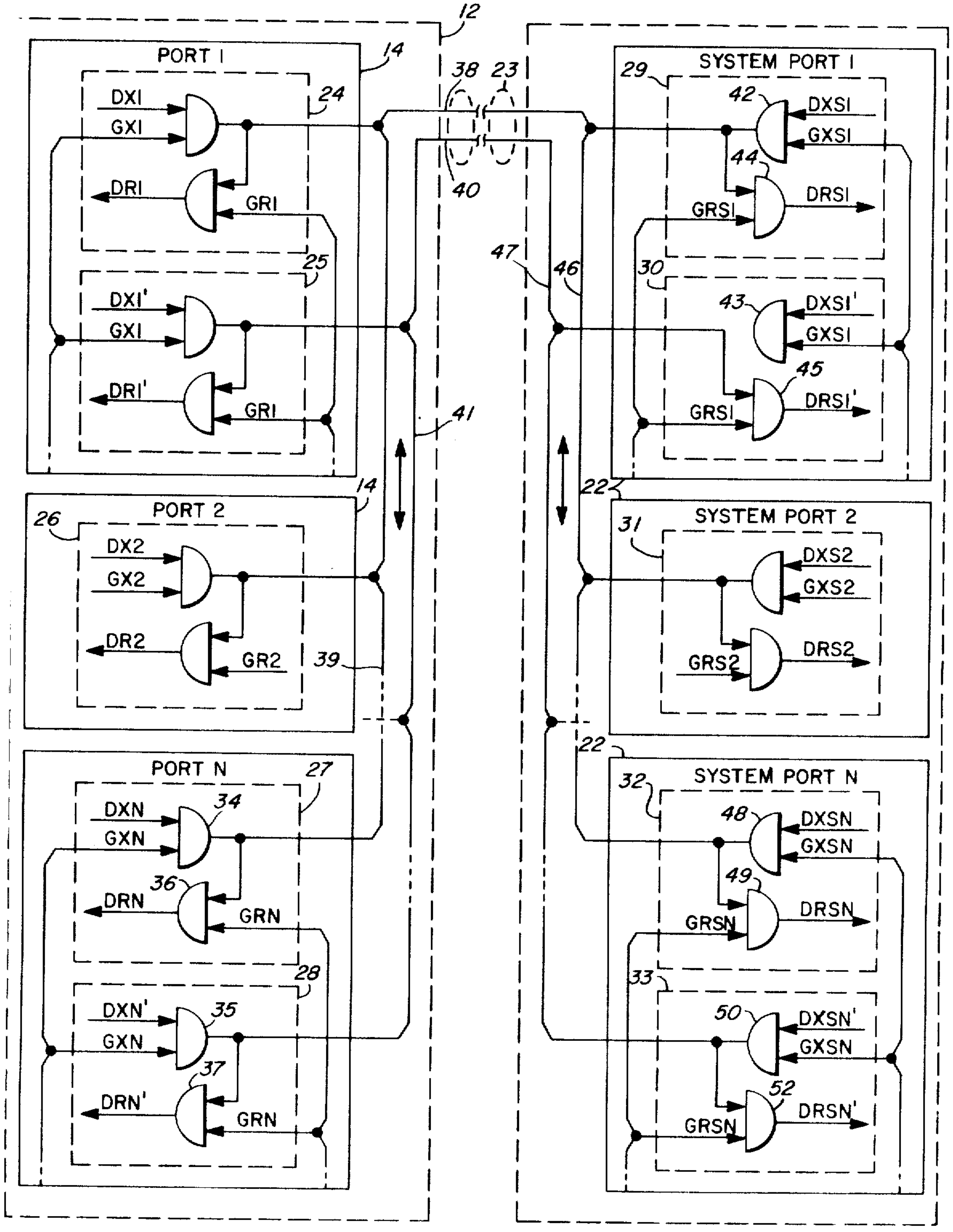
FIG. 2 is an improve system cabinet interconnection using series-connected logic apparatus.

In FIG. 2 is shown a plurality of ports 14 in a system controller 12 and a plurality of ports 22 called system ports in another data processing module of the system connected serially through a transmission cable 23. In the present embodiment, the data information signals transmitted by the communicating ports comprise information bits having an electrical binary quantity commonly known as a "1" or a "0" signal quantity. The circuits in the ports and the transmission lines in the cable 23 for only two information bits are shown for each of the ports. It is evident that in a data processing system such as disclosed in the aforementioned patent, 36 information bits are transferred simultaneously and therefore 36 like circuits and transmission lines are required for each port. Neither the number of information bits nor the number of ports shown are to be taken as limiting the present invention. Any number could by used for any purpose requiring the bidirectional transmission of information.

Still referring to FIG. 2, the system controller 12 comprises a port 1, a port 2, on through a port N, signifying the plurality of ports. A system controller may have many ports depending upon the number of data processing devices in the system that are connected to the system controller. Each port in all of the devices of the data processing system includes a transmitter-receiver pair circuit for each information bit. The transmitter-receiver pair circuits control which port is to transmit information and which port is to receive information. Thus in FIG. 2, a port 1 in the system controller 12 has a transmitter-receiver pair circuit 24 for information bit 1 and a transmitter-receiver pair circuit 25 for information bit 2. In port 2 a transmitter-receiver pair circuit 26 for information bit 1 only is shown. In port N, a transmitter-receiver pair circuit 27 for information bit 1 is shown along with a transmitter-receiver pair circuit 28 for information bit 2.

Figure 5:
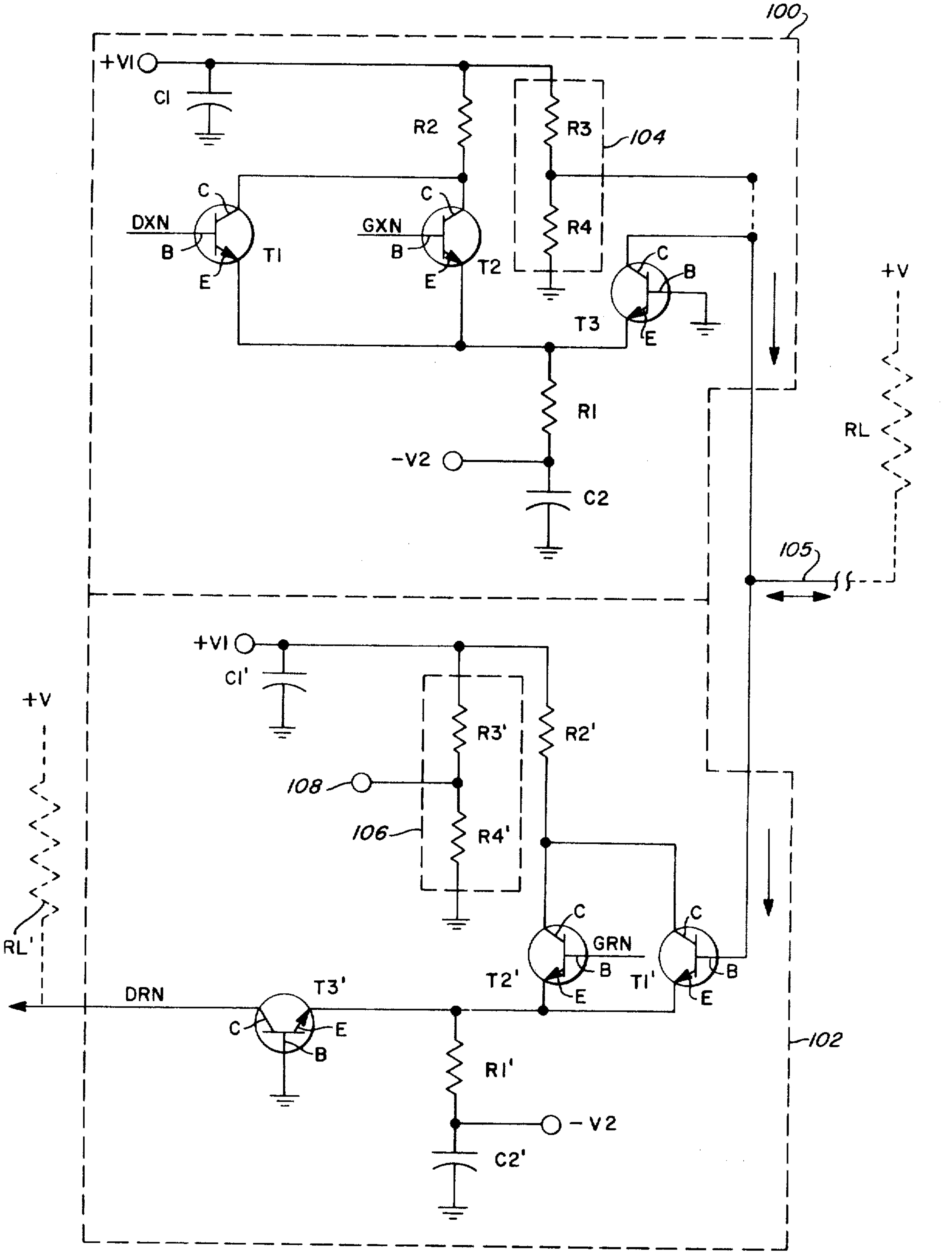
FIG. 5 is a circuit diagram of a transmitter-receiver pair circuit for use in the embodiments of FIGS. 2, 3, and 4.

The system ports 22 include similar sets of transmitter-receiver pair logic circuits. System port 1 shows a transmitter-receiver pair circuit 29 for information bit 1 and a transmitter-receiver pair circuit 30 for information bit 2. Only one transmitter-receiver pair circuit 31 for information bit 1 is shown in system port 2. In system port N, a transmitter-receiver pair circuit 32 is shown for transmitting and receiving information bit 1 and a transmitter-receiver pair circuit 33 is shown for information bit 2. A circuit for use as the transmitter-receiver pair circuit comprising the combination transmit and receive AND-gates located in each port is shown in FIG. 5 and will be explained later.

In FIG. 2, in the embodiments described herein, the data information signals are represented as DX with the location of the data transmit signal shown thereafter. Thus the data information transmit signal DXN represents the data information that is to be transmitted from port N of the system controller 12. The transmit control signal GX controls the port that is to transmit a data information signal. The transmit control signal is similarly represented, such as GXN, which is the transmit control signal connected to transmit logic gates 34 and 35 in port N of the system controller 12 controlling the transmit of the data information transmit signal DXN and DXN' from port N onto the transmission cable 23. The data receive signal DR is again similarly represented such as the data receive signal DRN in port N of the system controller 12. The data receive signal DRN is an output of a receive logic gate 36 for information bit 1 in port N, while the data receive signal DRN' is an output of a receive logic gate 37 for information bit 2. The data receive signal DRN is the controlled signal received from some other port in the system via a single lead bidirectional transmission line 38 and data bus 39 connected to an input of the receive logic gate 36. The receive control signal GR controls the port in the system which is to receive the data information transmitted on a single wire bidirectional transmission line from another port in the system. In particular the receive control signal GRN connected to a second input of the receive logic gates 36 and 37 in port N of the system controller 12 controls the receiving of data information bits 1 and 2 from the transmission line 38 via the data bus 39 and a transmission line 40 via a data bus 41, respectively.

The system ports 22 in the data processing system are similarly connected and each have a transmit logic gate for each information bit controlled by a transmit control signal GX and the data information transmit signal DX. System port 1 includes a transmit logic gate 42 in the transmitter-receiver pair circuit 29 for one information bit and a transmit logic gate 43 in the transmitter-receiver pair circuit 30 for another information bit. System port 1 also includes receive logic gates 44 and 45 for the two information bits shown in FIG. 2 and each are controlled by a receive control signal GRS1. Similar transmit and receive logic gates are included in the transmitter-receiver pair circuits 31, 32 and 33 of system ports 2 and N respectively. An output of each receive logic gate, as previously stated, transmits the data information receive signals DR into the particular port for utilization therein.

In the operation of the bidirectional transmission using the serial-connected logic apparatus of FIG. 2, it will be assumed that port N of the system controller 14 is to transmit data information for receipt by the system port N. A control signal GXN is first activated in order to enable the transmit AND-gate 34 for bit 1 and a transmit AND-gate 35 for bit 2 in port N. Data information signals DXN and DXN' are then introduced to the transmit AND-gates 34 and 35 respectively, and, since the AND-gates are enabled by the GXN control signal, the data information signals appear on the output leg of the transmit AND-gates. The output leg of the transmit AND-gate 34 is tied to the data bus 39 in the system controller 14, which data bus ties all of the particular information bit signals together from all of the ports within the system controller. The internal data bus lead 39 is connected to the transmission line 38 which represents a long lead interconnecting two cabinets of the data processing system. The transmission line 38 is directed to a system device which represents, in the data processing shown in FIG. 1, the modules in the data processing system.

As stated previously, the system ports 1 through N represent a plurality of ports in the data processing system. The ports within one device are tied together by a common data bus 46. Connected to this bus is the transmitter-receiver pair logic circuit AND-gates such as the transmit AND-gate 42 and the receive AND-gate 44 in system port 1. Since the data information signal is to be directed to system port N, the data information bit 1 is transmitted on the data bus 46 to the system port N. The data information bit 2 is transmitted from transmit AND-gate 35 to the data bus 41 and transmission line 40 to a data bus 47 and on the data bus 47 to system port N.

In system port N the output of a transmit AND-gate 48 and an input leg of a receive AND-gate 49 are fastened to the data bus 46. The data information signal bit 1 is directed to an input leg of a receive AND-gate of all of the system ports via the data bus. In the case of the data information presently being described, the control signal GRSN would activate the second leg of the receive AND-gates 49, and the data information signal for information bit 1 would activate the first leg of the receive AND-gate 49 thereby producing the data information receive signal DRSN on the output of the receive AND-gate 49 for use in the module containing the system port N. It is to be understood that the system controller, since it was sending the signals to system port N, activated the control signal GRSN prior to sending out the data information signals.

Similarly, the information bit 2 data information signals are transmitted via data bus 47 to the transmitter-receiver pair circuit 33 for connection to a transmit AND-gate 50 and a receive AND-gate 52. The bit 2 information signals activate the first leg of the receive AND-gate 52 and produce the data information receive signal DRSN'. The control signal GRSN is connected to the second leg of the receive AND-gate 52.

In reply to the transmitted signal, in order to complete the bidirectional flow of the transmission lines, the system port N could reply to the system controller port N by activating the control signal GXSN which is connected to one input leg of the transmit AND-gates in the system port N. The data information signals for transmission from system port N, the DXSN signal for information bit 1 and the DXSN' signal for information bit 2, complete the enabling of the transmit AND-gates 48 and 50. The data information signals for information bits 1 and 2 are transmitted from system port N onto the data bus 46 and data bus 47, respectively.

The data information signals are then transmitted by the transmission lines 38 and 40 in transmission cable 23 in the reverse direction as that sent into system port N. The data information is transmitted to the system controller data bus 39 for information bit 1 and to data bus 41 for information bit 2. The receive AND-gates 36 and 37 in system control port N are activated by the control signal GRN and the data information signals from the data buses 39 and 41 are directed to a second leg of the receive AND-gates. The control signal GRN is activated, for instance, by the system port N via a control signal line which is not shown but could be a similar bidirectional control signal transmission as that shown for the bidirectional transmission of data. The receive AND-gate 36 in port N upon activation transmits a data information signal DRN into the system controller for use by the system controller. The receive AND-gate 37 transmits the information bit 2 data information signal DRN' into the system controller.

All of the bit information output signals are transmitted at one time. Thus the transmit control signal GXN is shown in port N connected to all of the transmit AND-gates in port N. Similarly all of the bit informations are received into the receiving port at one time and thus the receive control signal GRN is shown connected together via a common control bus. The other ports are similarly connected such that a parallel transfer of information is performed.

It is evident that the data information signal transmitted to the data bus and the transmission line is received by all of the receive AND-gates in the data processing system. But only the ports which are to receive the data information are enabled via the receive control signal GR. Thus more than one port can be enabled to receive any transmitted signals although as a general rule only one port is enabled at any one time.

The lines connecting the system controller ports and the system ports are bidirectional transmission lines. A group of transmission lines can be tied together such as in flatline tape cable to form a transmission cable. Because of the speed of the communication signals between the modules of the data processing system, the transmission cable length is generally limited in length to prevent lowering transmission efficiency. If long distances are required to connect two modules of a data processing system, a central cable interconnect system is sometimes used. A method of interconnecting long lengths of transmission cable is shown in FIG. 3.

Figure 3:
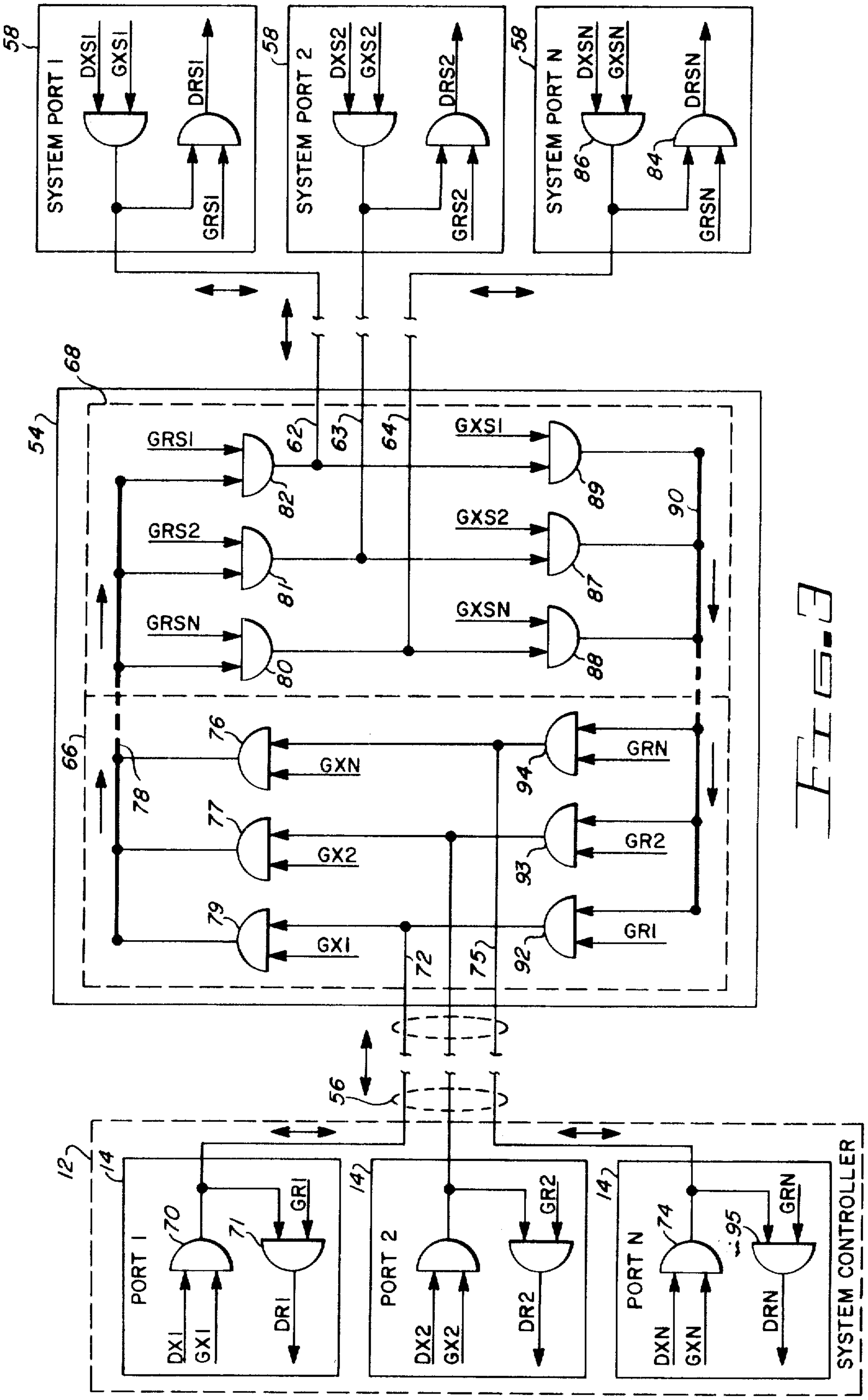
FIG. 3 is another embodiment of an improved system cabinet interconnection using parallel-connected logic apparatus.

In FIG. 3 a second embodiment is shown using parallel-connected logic apparatus. The internal connections of the individual ports 14 in the system controller 12 and ports 58 in the other modules of the data processing system are the same as the internal connections shown for the series-connected logic apparatus of FIG. 2. No internal data bus connections are made. The ports communicate between each other via a data bus box 54 interconnecting the transmission lines from each module in the system. Each port in the data processing system using the parallel-connected logic apparatus is connected in parallel to unidirectional common data buses and each port has a transmitter-receiver pair circuit as shown in FIG. 5 for each bit of information to be transmitted. More transmission lines are required than for the series-connected logic circuit of FIG. 2, but simpler interconnection of ports is attained. The interconnection of the transmitter-receiver circuits in the data bus box 54 allows a port in one module connected to a single transmission line and to the data bus box to communicate, that is, both transmit and receive data information with any other port in any other module in the system.

A plurality of ports, port 1 through port N, are shown in the system controller 12 in FIG. 3 representing any number of ports located within the system controller. A plurality of system ports, system port 1 through system port N, are again shown representing any number of ports located within any individual modules of the data processing system.

The individual ports 14 in the system controller 12 are connected via a transmission cable 56 to the data bus box 54. Also the individual system ports 58 are connected via transmission lines 62, 63 and 64, respectively, to the data bus box 54. The data bus box 54 is generally located within some centrally positioned cabinet and performs the function of terminating the long transmission lines. The data bus box 54 again terminates each transmission line from the individual ports with a transmitter-receiver pair circuit. The port transmitting the data information and the port receiving the data information are determined by the transmit and receive control inputs GX and GR, respectively, associated with each transmitter-receiver pair circuit.

Only one bit of data information for each port is shown in FIG. 3. As stated previously, since the data processing system presently being described can transmit 36 bits of data information in parallel, 36 transmitter-receiver pair circuits logically comprising a first AND-gate and a second AND-gate are included in each individual port in each device of the data processing system. The number of transmission lines connected to each port in the parallel connected logic apparatus is equal to the number of bits of data information in each port. Therefore, 36 transmission lines are connected to each port. Also 36 transmitter-receiver pair circuits must be located in each portion of the data bus box 54 such as a system controller portion or section 66 and a system portion or section 68.

Still referring to FIG. 3, as explained previously each transmitter-receiver circuit in logic terms comprises two AND-gates, such as in port 1, a transmit AND-gate 70 and a receive AND-gate 71. The transmit AND-gate 70 has its output connected to a transmission line 72 in transmission cable 56 and controls the transmission of data information from port 1 of the system controller. The data information transmit signal DX1 and the transmit control signal GX1 control the transmit AND-gate 70. Similarly, GR1 signal controls the receiving of the data information receive signal DR1 into port 1 by controlling an input leg of the receive AND-gate 71.

The operation of the parallel-connected logic apparatus is best described by enabling port N to transmit to data information signal DXN to the system port N as data receive signal DRSN. A transmit AND-gate 74 in port N is first enabled by the transmit control signal GXN. The receive control signal GRSN is activated to enable the receive gates in the data bus box 54 and the system port N. The data information signal DXN is transmitted by the transmit AND-gate 74 along a transmission line 75 to the system controller section 66 of the data bus box 54. Inside the data bus box 54 the transmission lead 75 is directed to an input leg of a receive AND-gate 76. The GXN signal is enabled and therefore the data information signal appears on an output of the receive AND-gate 76. The data information signals are transported on a data bus 78 in the direction of the arrow from the processor section 66 of the data bus box 54 into the system section 68. The data information signal appears on one leg of all of the group of transmit AND-gates 80, 81 and 82 in the system section 68. The transmit AND-gate 80 is enabled by the receive control signal GRSN since system port N is slated to receive the data information signals. The data information signals appear on the output of the transmit AND-gate 80 and are transmitted via the transmission line 64 to system port N receive AND-gate 84. The receive control signal GRSN has been previously enabled and therefore the data information signals DRSN are generated in system port N for utilization therein.

To show the bidirectional transmission along the same transmission lead, the system port N will be enabled to answer the request of port N. Therefore, the transmit control signal GXSN is enabled and the data information transmit signal DXSN is applied to a transmit AND-gate 86 in system port N. The output of the transmit AND-gate 86 is directed to the transmission line 64 and the data information signals are transmitted on the transmission line 64 to a receive AND-gate 88 in the system portion of the data bus box. The second input to the receive AND-gate 88 is controlled by the GXSN signal and is therefore in an enabled condition. The data information signals are transmitted onto a bus 90 and along the data bus 90 in the direction of the arrow into a group of transmit AND-gates 92, 93 and 94 in the system controller section 66 of the data bus box 54.

Since the data information signals are slated to be placed into port N, the transmit AND-gate 94 is enabled by the GRN signal applied to one leg of its input. The data information signals therefore control the output of the transmit AND-gate 94 and are transmitted along the transmission line 75 into a receive AND-gate 95 in port N. The receive control signal GRN enables the receive AND-gate 95 and the data information is directed into the system controller 12 via port N as the data information receive signal DRN.

Figure 4:
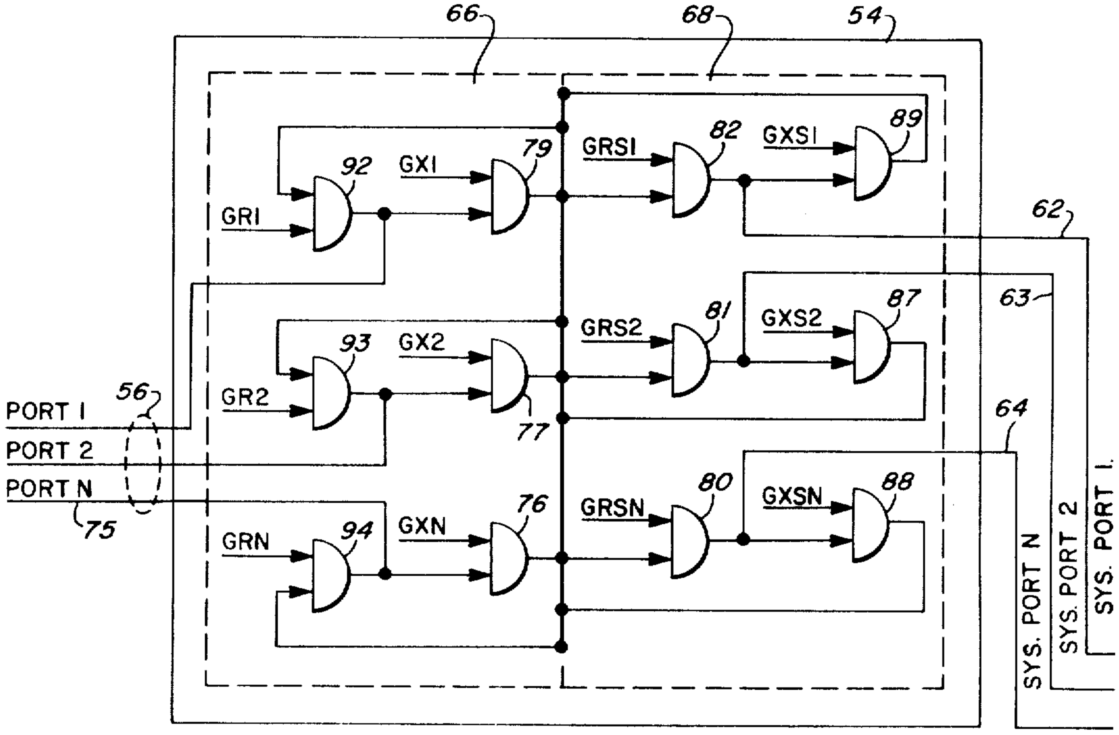
FIG. 4 is another embodiment of the parallel-connected logic apparatus of FIG. 3 using a single bidirectional data bus interconnection.

In FIG. 3 only one transmitter-receiver pair circuit is shown in each port. The one transmitter-receiver pair circuit transmits one bit of information. It is obvious that similar circuits and a similar operation is required in order to perform a parallel transfer of data information signals from one port to another port. The unidirectional data buses 78 and 90 in the data bus box 54 of FIG. 3 permit communication between different modules. FIG. 4 shows a bidirectional data bus permitting communication among all of the ports of the data processing system.

In FIG. 4 is shown another embodiment of the parallel-connected logic apparatus using one bidirectional data bus line 96 in the bus box 54, interconnecting the transmission cable 56 to the system controller ports 1 through port N, and the transmission line 62, 63, and 64 to the system ports 1 through system port N. The use of the single bus 96 permits the two-way communication between ports within one device of the data processing system such as communication between system port 1 and system port N. For instance, the data information being transmitted from system port 1 on the transmission lead 62 into the bus box 54 is connected to one input leg of the receive AND-gate 89. The other leg of the AND-gate 89 is connected to the transmit control signal of system port 1, the control signal GXS1. An output of the AND-gate 89 is connected to the bus line 96. The data information signal under control of the transmit signal GXSN1 is transmitted along the bus line 96 and since the data information is to be transmitted to system port N, the transmit AND-gate 80 is enabled by the receive control signal GRSN of system port N. The transmit AND-gate 80 is enabled by the receive control signal GRSN and the data information is transmitted onto the transmission lead 64 to system port N where it is received by the transmitter-receiver pair within system port N for utilization within the system module containing system port N.

Similarly a group of receive AND-gates 79, 77, and 76 control the data information signals received from port 1, port 2, and port N, respectively, and transmit the data information signals to the bidirectional bus line 96. If the data information is to be transmitted to system port 1, system port 2, or system port N, one of the group of transmit AND-gates 82, 81 or 80 is enabled, depending upon the system port requiring the data information signal. The data information signal could also be transmitted from the bus lead back to the system controller port 1, port 2, or port N via AND-gates 92, 93, or 94, respectively. The system port 1, system port 2, and system port N can transmit to any other port in the system because their respective transmission line is directed to receive AND-gates 89, 87, and 88, respectively. The output of the receive AND-gates 89, 87, and 88 are directed to the bus line 96 within the bus box 54 from which bus line the data information can be directed either back to a system port via AND-gates 82, 81 and 80, or back to the system controller ports via AND-gates 92, 93 and 94. The control input signal to each of the AND-gates is connected to a similar control signal as that connected to the transmitter-receiver pair circuits at the port outputs. Thus it is also required that the control signals be directed to the bus box 54 and in particular to the particular AND-gate for control of the bidirectional flow of data information. The bus box 54 is of special use and, in general, the special use of the parallel-connected logic apparatus is to permit an exceptionally long transmission lead between, for instance, the system controller and the remaining devices of the data processing system. The bus box permits terminating the transmission leads in their characteristic impedance before the exceptionally long transmission lead affects the rise and fall of the data information pulse signals. It is obvious that the data information signals transmitted by a port may be directed to several ports merely by activating the respective control signals and therefore the description of a single port receiving the data information signal should not be taken as limiting the present invention.

Still referring to FIG. 4, the data bus 96 within the bus box 54 is a time-shared data path comprising a double-terminated transmission line interconnecting all of the transmitter circuits and the receiver circuits. In general, the individual circuits are connected to the data bus 96 by stub wire length. The number of transmission circuits that can be connected to the data bus 96 is limited only by the transmission speed required. The data bus 96 performs a modified wired "OR" logic function. If any one transmitter output is activated, the bus is activated. If all of the transmitter circuits are inactivated, the bus is inactivated.

A circuit diagram of a transmitter-receiver pair circuit for use with the logic circuit apparatus of FIGS. 2, 3, and 4 is shown in FIG. 5. The transmitter-receiver pair circuit comprises a transmit circuit 100 and a receive circuit 102, each identical to the other. Each circuit includes three transistors, T1, T2 and T3. Two of the transistors, T1 and T2, are connected in tandem except for the control leads to form a logic AND-gating function driving a third transistor T3, a grounded base amplifier. A termination network 104 is provided for a transmission line 105.

Each end of a transmission line and a data bus is normally terminated in its characteristic impedance. The input impedances of the transmit circuit 100 and the receive circuit 102 are higher than the characteristic impedance of the transmission lines and data buses so as not to affect the loading of the transmission lines. The termination networks are provided and connected to the transmission line in order to terminate the transmission line in its characteristic impedance. In the transmit circuit 100, the termination network 104 comprises resistors R3 and R4. Resistors R3 and R4 form a divider network between a plus voltage V1 and ground. Thus, if the transmit circuit 100 is to be at the end of a data bus or at the end of a transmission line the junction of resistor R3 and R4 would be connected to the input of the transmission lead 105 into the transmit circuit 100.

The transmit circuit 100 comprises transistors T1, T2 and T3; capacitors C1 and C2; and resistors R1 and R2. The receive circuit 102 shown in FIG. 3 comprises transistors T1′, T2′ and T3′; capacitors C1′ and C2′; and resistors R1′ and R2′. As in the transmit circuit 100, a termination network 106 is provided in the receive circuit 102 comprising resistors R3′ and R4′. The termination network 106 would be connected to a transmission line at point 108 if the use of the transistor-receiver pair circuit dictates that the output of the receive circuit 102 is to be connected to a transmission lead. The termination network 106 is not used if the data information signal is connected internally in a port.

Each transistor in the transmitter-receiver pair circuit comprises three elements: a collector element C, a base element B and an emitter element E. The operation of a transistor is well known in the art and will not be explained here. All of the transistors are NPN-type transistors and therefore a collector to emitter current flow will begin when the base of the transistor becomes a positive potential with respect to the emitter element of the same transistor. In the steady or no transmission state, transistor T3 and T3′ are cut off or in a nonconductive state thereby placing the collector C of transistor T3 and T3′ at approximately the potential of voltage V connected to the circuit load represented as RL. Transistors T3 and T3′ are cut off because their base-emitter junction is reverse biased by the positive potential disabling signals applied to the base of transistors T3 and T3′. In a steady state, transistors T2 and T2′ are conducting. Transistors T1, T2, and T3 are current switches and therefore are either in a cutoff (inactivated) position, or in a saturated (activated) condition at any one time. Transmission line 105 forms an output of the transmit circuit and is connected to the collector of transistor T3. Transmission line 105 is also connected to the receive circuit as an input to the base of transistor T1′. Transmission line 105 is an input to the receive circuit.

The data information to be transmitted, the data transmit signal DXN, is applied to the base B of transistor T1. The transmit control signal GXN is applied to the base B of transistor T2. The data information signals received are applied to the base B of transistor T1′ via the transmission line. The receive control signal GRN is applied to the base B of transistor T2′. Capacitors C1 and C2, and C1′ and C2′ are connected between the voltage potentials applied to the circuit and ground in order to prevent any high-frequency noise pulses from affecting the circuit.

The emitter elements E of transistors T1, T2 and T3 are connected together to a common emitter source negative potential V2 through resistor R1. The collectors C of transistors T1 and T2 are connected together and have a positive potential V1 applied to the transistors through a load resistor R2. A positive potential applied to the base of either transistor T1 or T2 places the transistor in conduction and places the common emitter tie point at a positive potential. The output transistor T3 is thereby in a nonconductive or cutoff state since its base to emitter junction is reverse biased. As a usual case, the transmit control signal GXN is at a positive or disabling potential in order to prevent the data transmit signal DXN from appearing on the transmission line.

The operation of the transmit circuit is identical to the operation of the receive circuit. Therefore, only the transmit circuit of the transmitter-receiver pair will be explained and it is evident that the operation of the receive circuit is the same. To enable the transmit of the data information signals, the transmit control signal GXN is made a negative or enabling potential thereby permitting conduction by output transistor T3 by forward biasing the base to emitter junction of T3. The conduction of T3 would be from a positive potential V at the other end of the transmission line 105 through a load resistor RL, through the transmission line 105, from the collector C of transistor T3 to the emitter E and through the common emitter resistor R1 to the negative potential V2. The conduction of the output transistor T3 is thereafter controlled by the data information signals applied to the base of transistor T1 as data transmit signal DXN. There is no inversion in the amplification of the data information signal from T1 through the output transistor T3. A positive portion of a data information pulse applied to the base of transistor T1 causes the output transistor T3 to cease conduction and thereby a positive voltage pulse appears on the transmission line via the load resistor RL and the positive potential V at the other end of the transmission line. At the negative potential pulse portion of the data transmit signal DXN, transistor T1 stops conduction and output transistor T3 goes into full conduction or saturation and the current flow is from the positive potential V through the load resistor RL through the transmission line 105 and through the collector C of transistors T3 to the emitter E and the common emitter resistor R1 to the negative potential V2. Thus the data information pulses are transmitted onto the transmission line and into the port of another module in the data processing system. Likewise if the signal was to be received by the port depicting the transmitter-receiver pair of FIG. 5, the data information would be received by transistor T1′ under control of the receive control signal GRN and become an output data receive signal DRN in a similar manner as that explained for the transmit circuit.

Parts valves that can be used for the transmitter-receiver circuit of FIG. 5 for the voltage potential of V1=+2.0V and V2=−3.3V are set out below. Resistors are given in ohms and capacitors in pico-farads. Transistors are type 2N709.

| | |
|---|---|
| R1=R1′Ax140 | C1=C1′Ax10,000 |
| R2=R2′Ax20 | C2=C2′Ax10,000 |
| R3=R3′Ax268 | |
| R4=R4′Ax104 | |

Thus what has been shown as new is a unique logic apparatus that permits a bidirectional transmission of data between interconnecting module cabinets of a data processing system. A series-connected logic apparatus and two parallel-connected logic apparatus have been shown as embodiments to support the claimed invention. A unique circuit has also been shown for use with the bidirectional transmission of data. The transmitter-receiver pair circuit performs the function of controlling the transmitting and receiving of the data information into the devices of the data processing system in a unique manner and with the minimum of elements. It will be obvious to one skilled in the art that the apparatus and the embodiments as described can be used on data processing systems of the various types presently well known to the art. It is, of course, also well known that the logic apparatus as shown and the part values as given could be changed without departing from within the scope of this invention. It is also evident that the two embodiments can be intermixed in one data processing system configuration in order to attain the advantages of both the series-connected apparatus and the parallel-connected apparatus within one system. A parallel transfer of data information signals is described herein since the modern-day information processing system includes a parallel transfer to permit faster operation. It is evident that a serial transfer of data information signals could be accomplished using the apparatus described herein by using one transmitter-receiver pair circuit in each port connected to a bidirectional transmission line.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, with the limits only of the true spirit and scope of the invention.

We claim:

1. The apparatus for interconnecting modules of information processing equipment to provide the bidirectional transmission of information signals between said modules comprising:
 a plurality of communicating ports located within each of said modules;
 a plurality of transmitter-receiver pair logic circuits, at least one located in each port, for transmitting and receiving the information signals; and
 a plurality of single wire bidirectional transmission lines, each interconnecting one of said plurality of transmitter-receiver pair logic circuits located in each of said plurality of communicating ports in one of said modules to one other of said plurality of said transmitter-receiver pair logic circuits located in each of said plurality of communicating ports in a second one of said modules.

2. The apparatus of claim 1 wherein each of said transmitter-receiver pair logic circuits comprises:
 a transmit AND-gate having its output connected to said bidirectional transmission line, said transmit AND-gate controlled by a transmit control signal to direct said information signals onto said transmission line; and
 a receive logic AND-gate having an input leg connected to said transmission line, said receive logic AND-gate controlled by a receive control signal to direct onto its output the information signals from said transmission line for utilization within said module containing said transmitter-receiver pair logic circuit.

3. The transmitter-receiver pair logic circuit of claim 2 wherein both said transmit logic AND-gate and said receive logic AND-gate comprise a grounded base amplifier controlled by a current mode logic gate.

4. The transmitter-receiver pair logic circuit of claim 2 wherein said receive logic AND-gate and said transmit logic AND-gate both comprise:
 first, second and third transistors each having a base, a collector and an emitter;
 first, second and third reference potentials;
 first and second resistors;
 said emitter of said first, second and third transistors being connected to said second reference potential via said first resistor;
 said collector of said first and second transistor being connected to said first reference potential via said second resistor;
 said base of said first transistor being connected to said information signal;
 said base of said second transistor being connected to said transmit control signal;
 said base of said third transistor being connected to said third reference potential;
 said collector of said third transistor being connected to an output lead.

5. In a data processing system, the apparatus comprising:
 a system controller module having a plurality of communicating ports for transmitting data information signals out of said system controller module and for receiving data information signals into said system controller module;
 a system module requiring communication with said system controller module, said system module having a plurality of communicating ports for transmitting data information signals to said system controller module and for receiving said data information signals from said system controller module, each communicating port in said system module corresponding to one communicating port in said system controller module;
 at least one transmitter-receiver pair logic circuit located in each communicating port in said system controller module and in each communicating port in said system module for transmitting and receiving the information signals wherein said transmitter-receiver pair logic circuit includes a transmitter logic circuit and a receiver logic circuit both having the same circuit construction; and
 at least one single lead bidirectional transmission line connected on one end to one transmitter-receiver pair logic circuit located in said system controller module and connected on its other end to a corresponding transmitter-receiver pair logic circuit located in said system module.

6. The apparatus of claim 5 wherein said transmitter-receiver pair logic circuit comprises:
 a transmit AND-gate having its output connected to said bidirectional transmission line, said transmit AND-gate controlled by a transmit control signal to direct said data information signals onto said transmission line; and
 a receive logic AND-gate having an input leg connected to said transmission line, said receive logic AND-gate controlled by a receive control signal to direct the data information signals from said transmission line for utilization within said module containing said transmitter-receiver pair logic circuit.

7. The apparatus for interconnecting modules of information processing equipment to provide the bidirectional transmission of data information signals including a plurality of information bits between said modules, said apparatus comprising:
 at least one communicating port located within each of said modules;
 a plurality of transmitter-receiver pair logic circuits located within each of said communicating ports, each of said plurality of transmitter-receiver pair logic circuits capable of transmitting and receiving one electrical binary quantity information bit of said data information signal;
 a plurality of single lead bidirectional transmission lines, each of said transmission lines interconnecting a particular one of said plurality of transmitter-receiver pair logic circuits located in a communicating port within one of said modules to another one of said plurality of transmitter-receiver pair logic circuits located in said communicating port within another one of said modules, each of said plurality of single lead bidirectional transmission lines transmitting one of said information bits in said data information signal.

8. The apparatus of claim 7 wherein each of said transmitter-receiver pair logic circuits comprises:
 a transmit AND-gate having its output connected to said bidirectional transmission line, said transmit AND-gate controlled by a transmit control signal to direct said data information signals onto said transmission line; and
 a receive logic AND-gate having an input leg connected to said transmission line, said receive logic AND-gate controlled by a receive control signal to direct the data information signals from said transmission line for utilization within said module containing said transmitter-receiver pair logic circuit.

9. In a data processing system, the apparatus for transferring data information signals including a plurality of information bit signals, said apparatus comprising:
 a system controller module having a plurality of communicating ports;
 a system module requiring two-way communication with said system controller module, said system module having a plurality of communicating ports;
 a plurality of transmitter-receiver pair logic circuits located within each of said plurality of communicating ports of said system controller module and said system module, each including a transmitter logic circuit and a receiver logic circuit both having the same circuit construction, one of said transmitter-receiver pair of logic circuits in each of said plurality of communicating ports of said system controller module and said system module transmitting and receiving one particular information bit signal;

a plurality of data buses located within said system controller module and said system module, and interconnecting all of said transmitter-receiver pair logic circuits transmitting and receiving the same particular bit of information; and a plurality of single lead bidirectional transmission lines, each individually connected on one end to one of said plurality of data buses located within said system controller and connected on the other end to one of said plurality of data buses located within said system module and each transferring one information bit signal to and from said system module and said system controller module.

10. The apparatus of claim 9 wherein each of said transmitter-receiver pair logic circuits comprises:

a transmit AND-gate having its output connected to said bidirectional transmission line, said transmit AND-gate controlled by a transmit control signal to direct said data information signals onto said transmission line; and a receive logic AND-gate having an input leg connected to said transmission line, said receive logic AND-gate controlled by a receive control signal to direct the data information signals from said transmission line for utilization within said module containing said transmitter-receiver pair logic circuit.

11. Apparatus for providing a two-way parallel transfer of a data information signal having a plurality of information bits between modules of the data processing system, said apparatus comprising:

a plurality of communicating ports located within each of said modules;

a plurality of transmitter-receiver pair logic circuits located within each of said plurality of communicating ports, one of said plurality of transmitter-receiver pair logic circuits within each of said plurality of communicating ports provided for transmitting and receiving a particular one of said plurality of information bits;

a plurality of data buses located in each of said modules, each interconnecting a particular one of said transmitter-receiver pair logic circuits from each of said communicating ports located within one module according to the particular information bit to be transmitted and received; and a plurality of single lead bidirectional transmission lines, each individual one of said plurality of single lead bidirectional lines connected on one end to a particular one of said plurality of data buses in one of said modules for transmitting and receiving a particular information bit and connected on the other end to a particular one of said plurality of data buses located within a second module for transmitting and receiving said particular information bit.

12. The apparatus of claim 11 wherein each of said transmitter-receiver pair logic circuits comprises:

a transmit AND-gate having its output connected to said bidirectional transmission line, said transmit AND-gate controlled by a transmit control signal to direct said data information signals onto said transmission line; and a receive logic AND-gate having an input leg connected to said transmission line, said receive logic AND-gate controlled by a receive control signal to direct the data information signals from said transmission line for utilization within said module containing said transmitter-receiver pair logic circuit.

13. In a data processing system, the apparatus for providing two-way communication of data information signals having a plurality of information bits, said apparatus comprising:

a system controller module having a plurality of communicating ports;

a system module having a plurality of communicating ports;

a plurality of transmitter-receiver pair logic circuits, at least one transmitter-receiver pair logic circuit located in each of said communicating ports for transmitting and receiving data information signals;

a data bus box having a system controller section and a system section, said system controller section including at least one transmitter-receiver pair logic circuit for each of said plurality of communicating ports in said system controller module, said system section including at least one transmitter-receiver pair logic circuit for each of said plurality of communicating ports in said system module;

a plurality of single lead bidirectional transmission lines, an individual one of a group of said transmission lines connected on one end to one transmitter-receiver pair logic circuit in said communicating port in said system controller module and connected on its other end to one of said transmitter-receiver pair logic circuits in said system controller section of said data bus box for each of said information bits, another group of said transmission lines individually connected on one end to one transmitter-receiver pair logic circuit in said communicating port in said system module and connected on its other end to one of said transmitter-receiver pair logic circuits in said system section of said data bus box for each of said information bits; and at least one data bus interconnecting the transmitter-receiver pair logic circuits in said system controller section to the transmitter-receiver pair logic circuits in said systems section in said data bus box.

14. The apparatus of claim 13 wherein each of said transmitter-receiver pair logic circuits comprises:

a transmit AND-gate having its output connected to said bidirectional transmission line, said transmit AND-gate controlled by a transmit control signal to direct said data information signals onto said transmission line; and a receive logic AND-gate having an input leg connected to said transmission line, said receive logic AND-gate controlled by a receive control signal to direct the data information signals form said transmission line for utilization within said module containing said transmitter-receiver pair logic circuit.

15. The transmitter-receiver pair logic circuit of claim 14 wherein both said transmit logic AND-gate and said receive logic AND-gate comprises a grounded base amplifier controlled by a current mode logic gate.

* * * * *